U S010712949B2

United States Patent
Hahn et al.

(10) Patent No.: US 10,712,949 B2
(45) Date of Patent: Jul. 14, 2020

(54) ADAPTIVE DEVICE QUALITY OF SERVICE BY HOST MEMORY BUFFER RANGE

(71) Applicant: Western Digital Technologies, Inc., San Jose, CA (US)

(72) Inventors: Judah Gamliel Hahn, Ofra (IL); Alon Marcu, Tel Mond (IL); Itshak Afriat, Sunnyvale, CA (US); Shay Benisty, Beer Sheva (IL); Ariel Navon, Revava (IL); Alex Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 143 days.

(21) Appl. No.: 15/808,209

(22) Filed: Nov. 9, 2017

(65) Prior Publication Data

US 2019/0138220 A1    May 9, 2019

(51) Int. Cl.
*G06F 3/00* (2006.01)
*G06F 3/06* (2006.01)
*G06F 12/02* (2006.01)

(52) U.S. Cl.
CPC .......... *G06F 3/0611* (2013.01); *G06F 3/0659* (2013.01); *G06F 3/0688* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| 6,377,251 | B1 * | 4/2002 | Takasu | G09G 1/16 |
| | | | | 345/204 |
| 6,480,946 | B1 * | 11/2002 | Tomishima | G11C 5/063 |
| | | | | 711/167 |
| 7,526,593 | B2 | 4/2009 | Mandal et al. | |
| 7,647,467 | B1 | 1/2010 | Hutsell et al. | |
| 9,569,352 | B2 | 2/2017 | Marcu et al. | |
| 2011/0145478 | A1 | 6/2011 | Mangold | |
| 2011/0295587 | A1 * | 12/2011 | Eeckhout | G06F 17/5022 |
| | | | | 703/21 |
| 2012/0011301 | A1 | 1/2012 | Goss et al. | |
| 2015/0160893 | A1 * | 6/2015 | Gorobets | G06F 3/061 |
| | | | | 711/103 |
| 2015/0301744 | A1 | 10/2015 | Kim et al. | |
| 2015/0324283 | A1 * | 11/2015 | Lai | G06F 3/06 |
| | | | | 714/764 |

(Continued)

OTHER PUBLICATIONS

International Search Report and Written Opinion in International Application No. PCT/US2018/052439, dated Jan. 18, 2019, 9 pages.

*Primary Examiner* — David Yi
*Assistant Examiner* — Craig S Goldschmidt
(74) *Attorney, Agent, or Firm* — Brinks Gilson & Lione (57) ABSTRACT

A system and method for reducing performance penalties of a host that is supplying a host memory buffer (HMB) for use by a storage device. The method may include modeling desired HMB access timing by the storage device in an initial offline analysis for multiple classes of workloads, periodically updating the access timing data stored in the storage device based on actual use and using the current HMB access timing information to modify storage device access to the HMB on the host. The system may include a storage device controller that quantifies different HMB access timing for different host workloads based on individual HMB regions.

18 Claims, 9 Drawing Sheets

(56) References Cited

U.S. PATENT DOCUMENTS

2015/0347036 A1* 12/2015 Hunter .............. G11C 11/40611
                                                    711/106
2016/0026406 A1   1/2016  Gamliel et al.
2017/0109205 A1*  4/2017  Ahuja ..................... G06F 9/505
2017/0293562 A1  10/2017  Zaretsky et al.

* cited by examiner

ADAPTIVE DEVICE QUALITY OF SERVICE BY HOST MEMORY BUFFER RANGE

BACKGROUND

Storage systems, such as solid state drives (SSDs) including NAND flash memory, are commonly used in electronic systems ranging from consumer products to enterprise-level computer systems. The market for SSDs has increased and its acceptance for use by private enterprises or government agencies to store data is becoming more widespread. Some SSDs may utilize a portion of random access memory (RAM) on a connected host device that is dedicated for control by the SSD, referred to herein as a host memory buffer (HMB). An SSD, using the HMB on a connected host device, can often improve its performance and responsiveness. The improved performance and responsiveness of the SSD storage may, however, come at the price of dragging down total system performance. For example, heavy use of the HMB on the host by the SSD may cause host performance or power issues on the host due to contentions on the data bus, such as a PCIe bus, or other host/device shared resources.

DETAILED DESCRIPTION

In order to address the challenges of improving storage device performance through host memory buffer (HMB) use, but maintaining a desired overall system performance, a system and method of adaptively adjusting quality of service is provided. The system and method identifies access needs and resource usage of different regions of the HMB and adjusts a respective delay imposed on access to the different regions of the HMB. In different implementations, the system and method is configured to limit throughput in certain steps of a transaction in order to improve overall host responsiveness by reducing contentions on a data interface, such as a PCIe interface. An HMB access modification module within the storage device controller may detect when HMB access is gating performance or bandwidth. The host may specify a total bandwidth or latency cap using existing PCIe mechanisms such as a latency tolerance reporting (LTR) function.

According to a first aspect a non-volatile memory system includes a non-volatile memory and a controller in communication with the non-volatile memory. The controller is configured to store and retrieve data from a host memory buffer on a host in communication with the non-volatile memory system. The controller is further configured to add a first delay period to all accesses made by the controller to a first memory region of the host memory buffer, and add a second delay period to all accesses made by the controller to a second memory region of the host memory buffer, where the first and second delay periods differ and the first memory region differs from the second memory region.

In another aspect, a method of processing memory accesses by a non-volatile memory system to a host memory buffer on a host may include determining, in the non-volatile memory system, an initial host memory buffer access timing in an offline modeling process and storing the initial host memory buffer access timing. The method may further include identifying a workload class (type) for commands to be executed by a controller of the non-volatile memory system and accessing the host memory buffer according to the initial host memory buffer access timing and based on the identified workload class. The method may also include modifying the initial host memory buffer access timing in response to receipt of host response latency data from the host.

According to another aspect, a non-volatile memory system is disclosed that may have a non-volatile memory and a controller in communication with the non-volatile memory. The controller may include means for determining an initial host memory buffer access timing in an offline modeling process and storing the initial host memory buffer access timing in the non-volatile memory system. The controller may also include means for identifying a workload class for commands to be executed by a controller of the non-volatile memory system and accessing the host memory buffer according to the initial host memory buffer access timing and based on the identified workload class. Additionally, the controller may include means for modifying the initial host memory buffer access timing in response to receipt of host response latency data from the host.

Figures 1A, 1B:
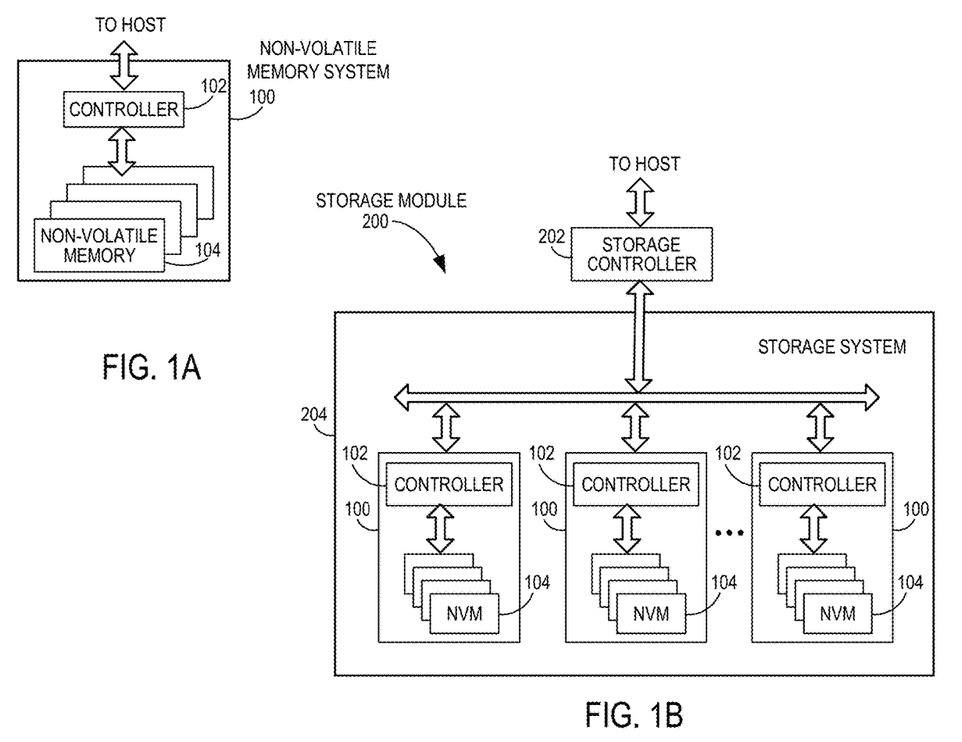
FIG. 1A is a block diagram of an example non-volatile memory system.
FIG. 1B is a block diagram illustrating an exemplary storage module.

Referring now to FIG. 1A, a block diagram illustrating the non-volatile memory (NVM) system 100 is shown. The NVM system 100 includes a controller 102 and non-volatile memory 104 that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, one or more microprocessors or processors (also referred to herein as central processing units (CPUs)), and a computer-readable medium that stores computer-readable program code (e.g., software or firmware) executable by the (micro)processors, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, NVM system 100 may be a card-based system, such as a secure digital (SD) or a micro secure digital (micro-SD) card. In an alternate embodiment, NVM system 100 may be part of an embedded memory system.

Although, in the example illustrated in FIG. 1A, NVM system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural NVM systems 100. As such, storage module 200 may include a storage controller 202 that interfaces with a host and with storage system 204, which includes a plurality of NVM systems 100. The interface between storage controller 202 and NVM systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
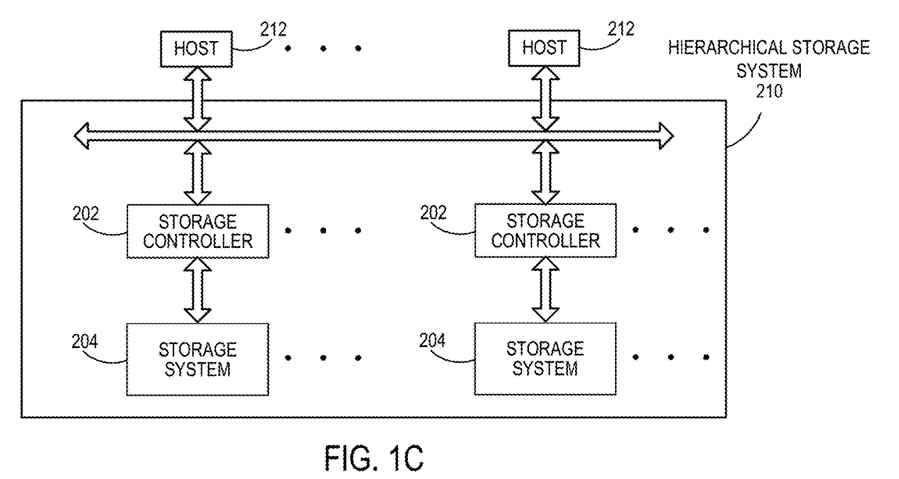
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
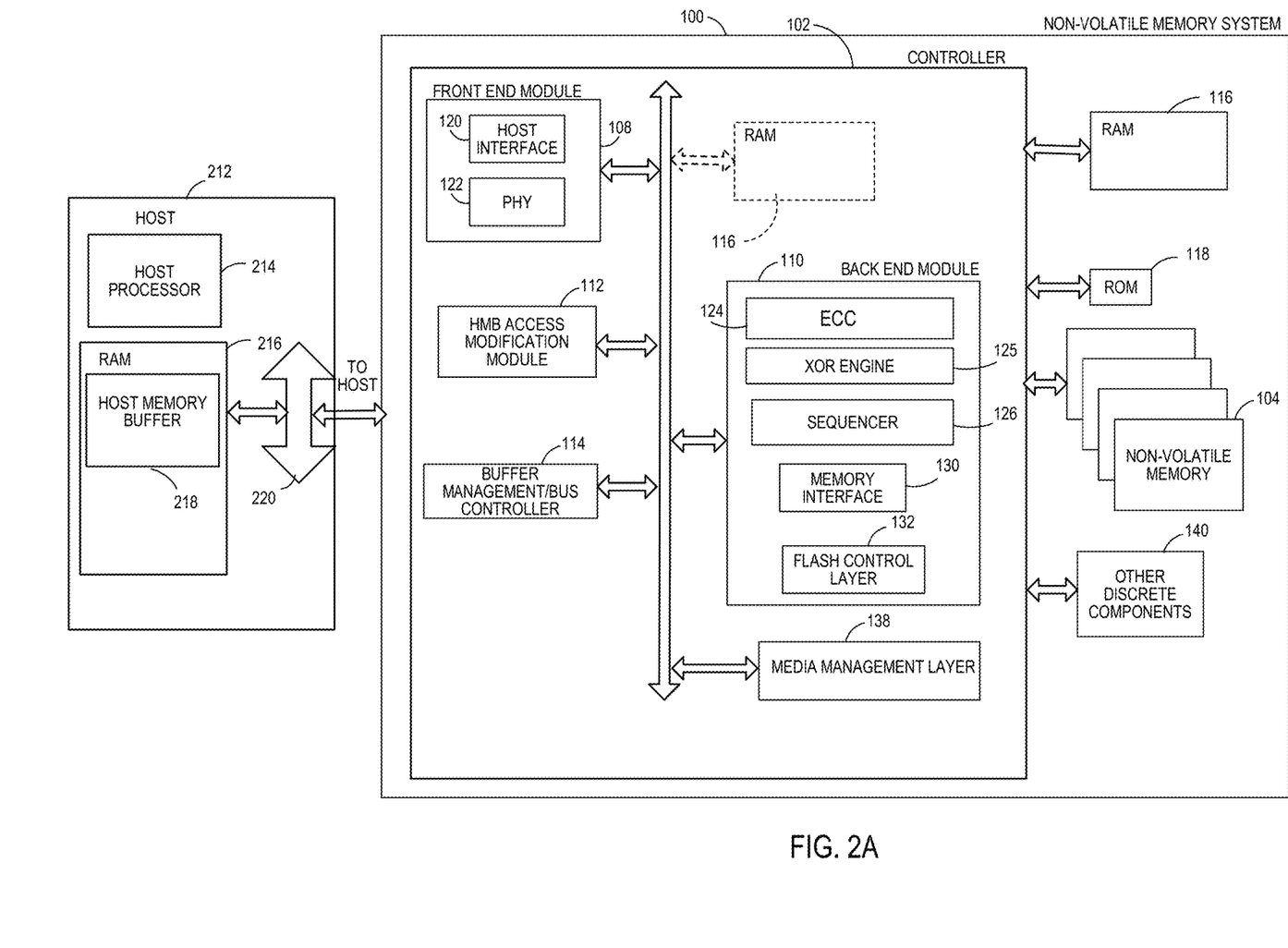
FIG. 2A is a block diagram illustrating exemplary components of a controller of a non-volatile memory system.

FIG. 2A is a block diagram illustrating exemplary components of a controller 102 in the NVM system 100. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a host memory buffer (HMB) access modification module 112 present on the die of the controller 102. As described below, the HMB access modification module 112, in cooperation with the controller, may provide functionality for analyzing access patterns and latency with respect to NVM system accesses to a host memory buffer (HMB) 218 on the host 212. The HMB access modification module 112 may also contain functionality for implementing delays in NVM system access to the HMB 218 to maintain a low overall latency in storage operations, as measured by the time between synchronous commands or commands sent by the host with a low aggregate queue depth. The HMB access modification module 112 may dynamically adjust HMB 218 access delay times based on ongoing measurement of latency and access patterns. Also, the HMB access modification module 112, may implement different access delays to different regions of memory within the HMB 218.

A buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller. Further, in some implementations, the controller 102, RAM 116, and ROM 118 may be located on separate semiconductor die. The RAM 116 may be any of one or more types of RAM, such as SRAM or DRAM.

The RAM 116 in the NVM system 100, whether outside the controller 102, inside the controller or present both outside and inside the controller 102, may contain a number of items, including a copy of one or more pieces of the logical-to-physical mapping tables for the NVM system 100. The RAM 116 may contain logged non-volatile memory performance data gathered by the controller 102. FIG. 2A also illustrates an example of a host system 212 that may be used with the NVM system 100. The host system 212 may include a host processor 214 and memory such a volatile and/or non-volatile memory. An example of volatile memory, RAM 216, is shown in this example. Furthermore, the host 212 may dedicate a portion of its memory to a host memory buffer 218 that is actually memory on the host 212, but dedicated by the host processor 214 for use and access by the controller 102 of the NVM system 100. As described in greater detail below, the host memory buffer 218 may be used by the NVM system 100 instead of or in addition to RAM 116 on the NVM system 100, for storing some or all of firmware or other data used by the NVM system 100.

Referring again to the controller 102, front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, UFS, PCIe/AHCI, and PCIe/NVMe. The host interface 120 typically facilitates transfer for data, control signals, and timing signals. Although any of the above-noted interfaces are contemplated, in implementations described herein, the PCIe/NVMe interface is discussed, where PCIe is a physical interface, and NVMe is a logical interface that can use PCIe for its physical transport. In versions of the host 212 and NVM system 100 utilizing PCIe, the HMB access modification module 112 may address latency and host power issues by modifying accesses (for purposes other than host-initiated data transfer) by the NVM system 100 of the HMB 218 via the PCIe bus 220 on the host 212. As described in greater detail herein, the HMB access modification module 112 may selectively limit the rate of specific PCIe accesses by the NVM system 100 based on implicit or explicit feedback from the host 212.

Back end module 110 includes an error correction controller (ECC) engine 124 that encodes the data bytes received from the host, and decodes and error corrects the data bytes read from the non-volatile memory 104. The ECC applied to the host data to create the codewords may be any one of several types of ECC, such as BCH codes (or other cyclic error-correcting codes) or low-density parity check (LDPC) codes which are useful to recover high numbers of error bits, where errors may come from individual memory cells. It is contemplated that this type of ECC is applied by the ECC engine 124 and used last before programming and first when reading. The back end module 110 may also include an exclusive OR (XOR) engine 125 for managing XOR processing for the NVM system 100.

A command sequencer 126 generates command sequences, such as program and erase command sequences, to be transmitted to non-volatile memory die 104. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of NVM system 100 illustrated in FIG. 2A include the media management layer 138, which performs wear leveling of memory cells of non-volatile memory die 104 and manages mapping tables and logical-to-physical mapping or reading tasks. NVM system 100 also includes other discrete components 140, such as external electrical interfaces, external RAM, resistors, capacitors, or other components that may interface with controller 102. In alternative embodiments, one or more of the physical layer interface (PHY) 122, media management layer 138 and buffer management/bus controller 114 are optional components that are not necessary in the controller 102.

Figure 2B:
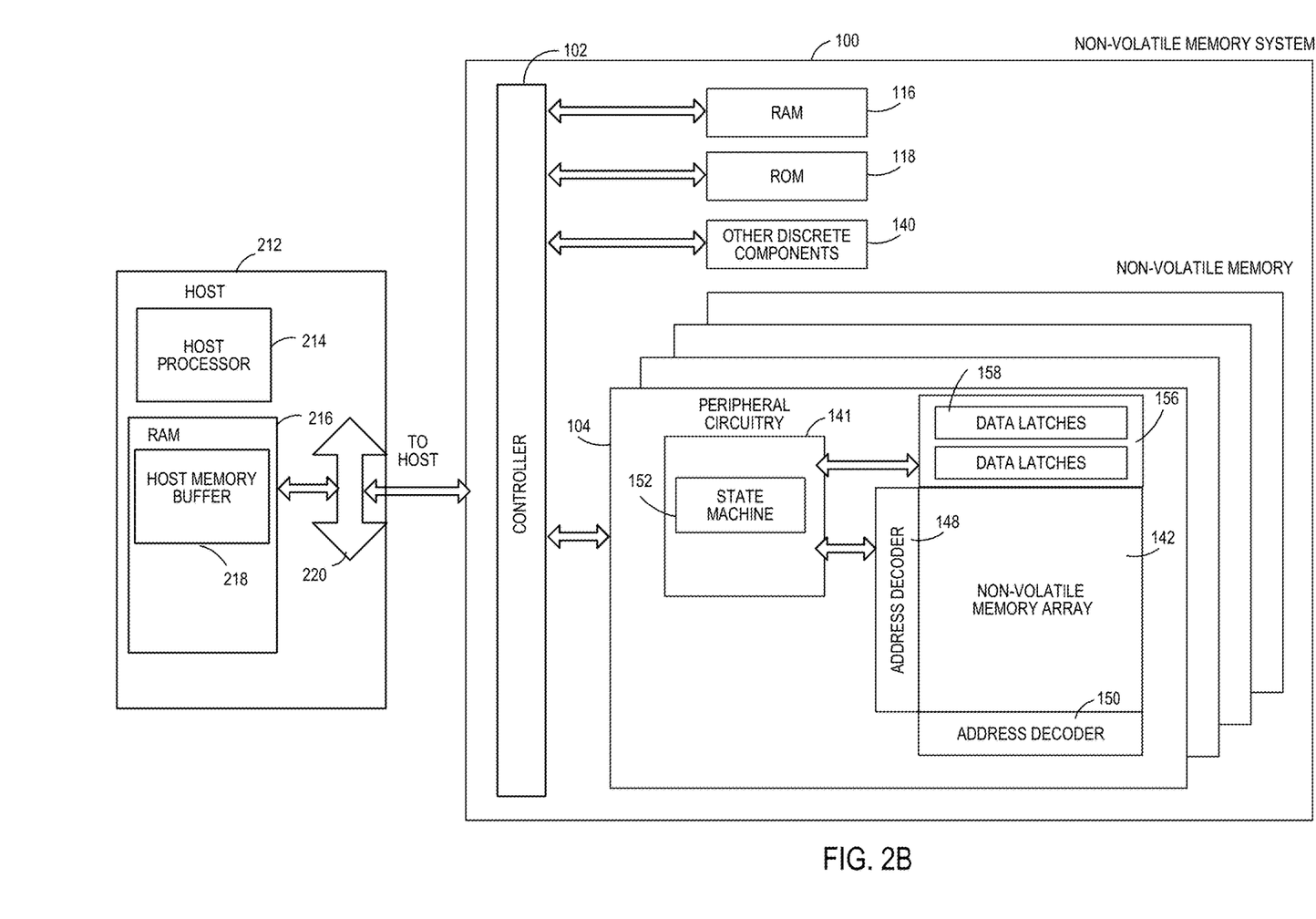
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two-dimensional and/or three-dimensional configuration. Address decoders 148, 150 may be used to access information in the non-volatile memory array 142. Peripheral circuitry 141 includes a state machine 152 that provides status information to controller 102. Non-volatile memory die 104 further includes a data cache 156 that caches data being read from or programmed into the non-volatile memory cells of the non-volatile memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

In one implementation, an individual data latch may be a circuit that has two stable states and can store 1 bit of data, such as a set/reset, or SR, latch constructed from NAND gates. The data latches 158 may function as a type of volatile memory that only retains data while powered on. Any of a number of known types of data latch circuits may be used for the data latches in each set of data latches 158. Each non-volatile memory die 104 may have its own sets of data latches 158 and a non-volatile memory array 142. Peripheral circuitry 141 includes a state machine 152 that provides status information to controller 102. Peripheral circuitry 141 may also include additional input/output circuitry that may be used by the controller 102 to transfer data to and from the data latches 158, as well as an array of sense modules operating in parallel to sense the current in each non-volatile memory cell of a page of memory cells in the non-volatile memory array 142. Each sense module may include a sense amplifier to detect whether a conduction current of a memory cell in communication with a respective sense module is above or below a reference level.

Figure 3:
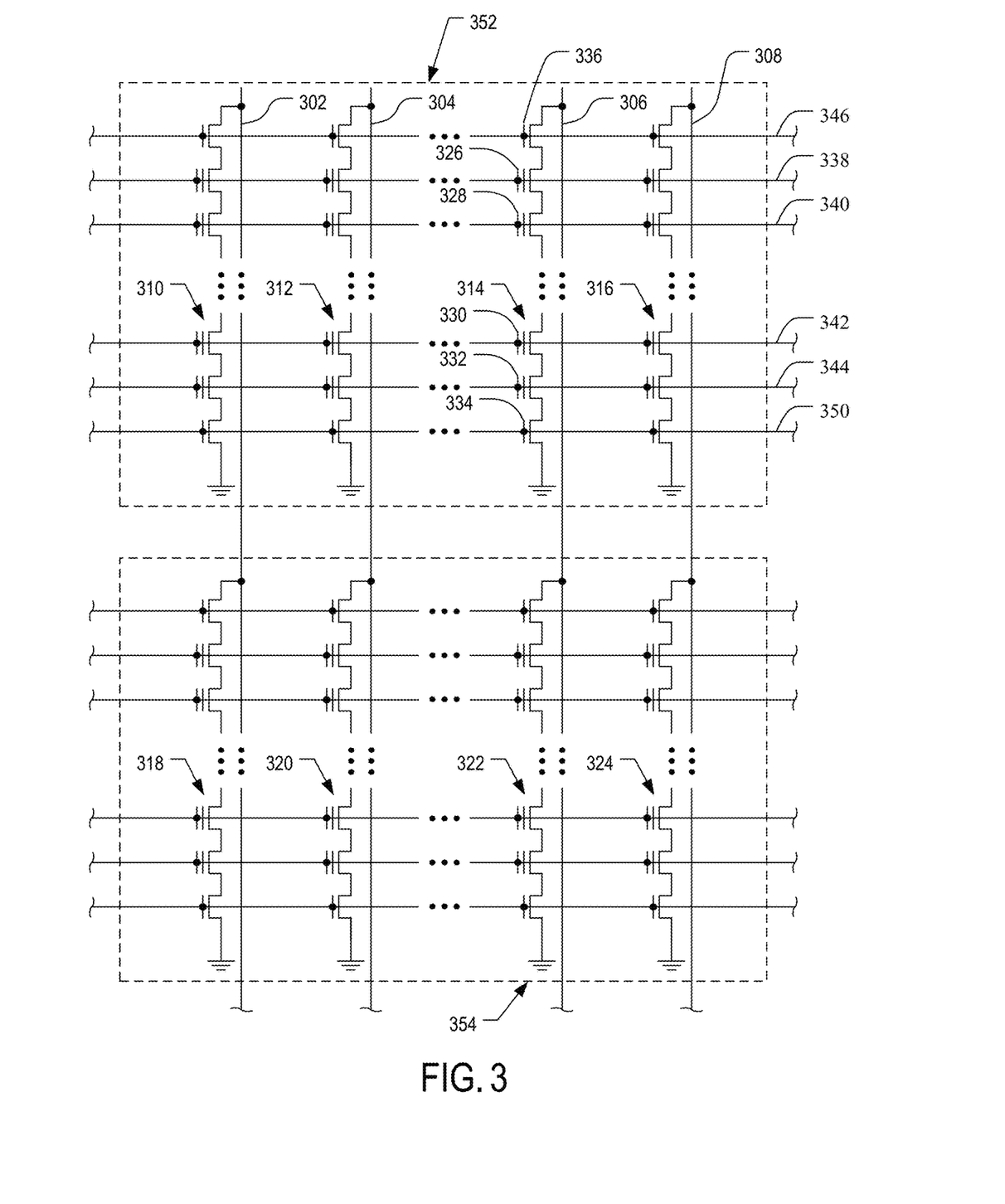
FIG. 3 is an example of a non-volatile memory circuit array illustrating block and word line arrangements.

An example NAND array is illustrated in FIG. 3. While a large number of global bit lines are provided in a NAND array, only four such lines 302-308 are shown in FIG. 5 for simplicity of explanation. A number of series connected memory cell strings 310-324 are connected between one of these bit lines and a reference potential. Using the memory cell string 314 as representative, a plurality of charge storage memory cells 326-332 are connected in series with select transistors 334 and 336 at either end of the string. When the select transistors of a string are rendered conductive, the string is connected between its bit line and the reference potential. One memory cell within that string is then programmed or read at a time.

Word lines 338-344 of FIG. 3 individually extend across the charge storage element of one memory cell in each of a number of strings of memory cells, and gates 346 and 350 control the states of the select transistors at each end of the strings. The memory cell strings that share common word and control gate lines 338-350 are made to form a block 352 of memory cells that are erased together. This block of cells contains the minimum number of cells that are physically erasable at one time. One row of memory cells, those along one of the word lines 338-344, are programmed at a time. Conventionally, the rows of a NAND array are programmed in a prescribed sequential order, in this case beginning with the row along the word line 344 closest to the end of the strings connected to ground or another common potential. The row of memory cells along the word line 342 is programmed next, and so on, throughout the block 352.

A second block 354 is similar, its strings of memory cells being connected to the same global bit lines as the strings in the first block 352 but having a different set of word and control gate lines. The word and control gate lines are driven to their proper operating voltages by row control circuits. If there is more than one plane in the system, one memory architecture uses common word lines extending between them. There can alternatively be more than two planes that share common word lines. In other memory architectures, the word lines of individual planes are separately driven. While the example NAND array illustrated in FIG. 3 has been used to describe a process for writing data to a memory block in a forward direction, to write data to a memory block in either a forward direction or a reverse direction, a controller may change which end of the memory cell strings is connected is connected a ground or other common potential.

The non-volatile flash memory array 142 in the non-volatile memory 104 may be arranged in blocks of memory cells as illustrated above where a block of memory cells is the unit of erase, i.e., the smallest number of memory cells that are physically erasable together. For increased parallelism, however, the blocks may be operated in larger meta-block units. One block from each of at least two planes of memory cells may be logically linked together to form a metablock. Each block is further divided into a plurality of pages and/or word lines, where each page or word line is typically an instance of the smallest individually accessible (readable) portion in a block. In some implementations, such as for some types of flash memory, the smallest individually accessible unit of a data set is a sector, which is a subunit of a page. Thus, a block may include a plurality of pages, where each page contains a plurality of sectors and each sector is the minimum unit of data for writing data to, or reading data from, the NVM system 100.

The blocks disclosed in FIG. 3 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the NVM system 100 where the data is physically stored.

Figure 4:
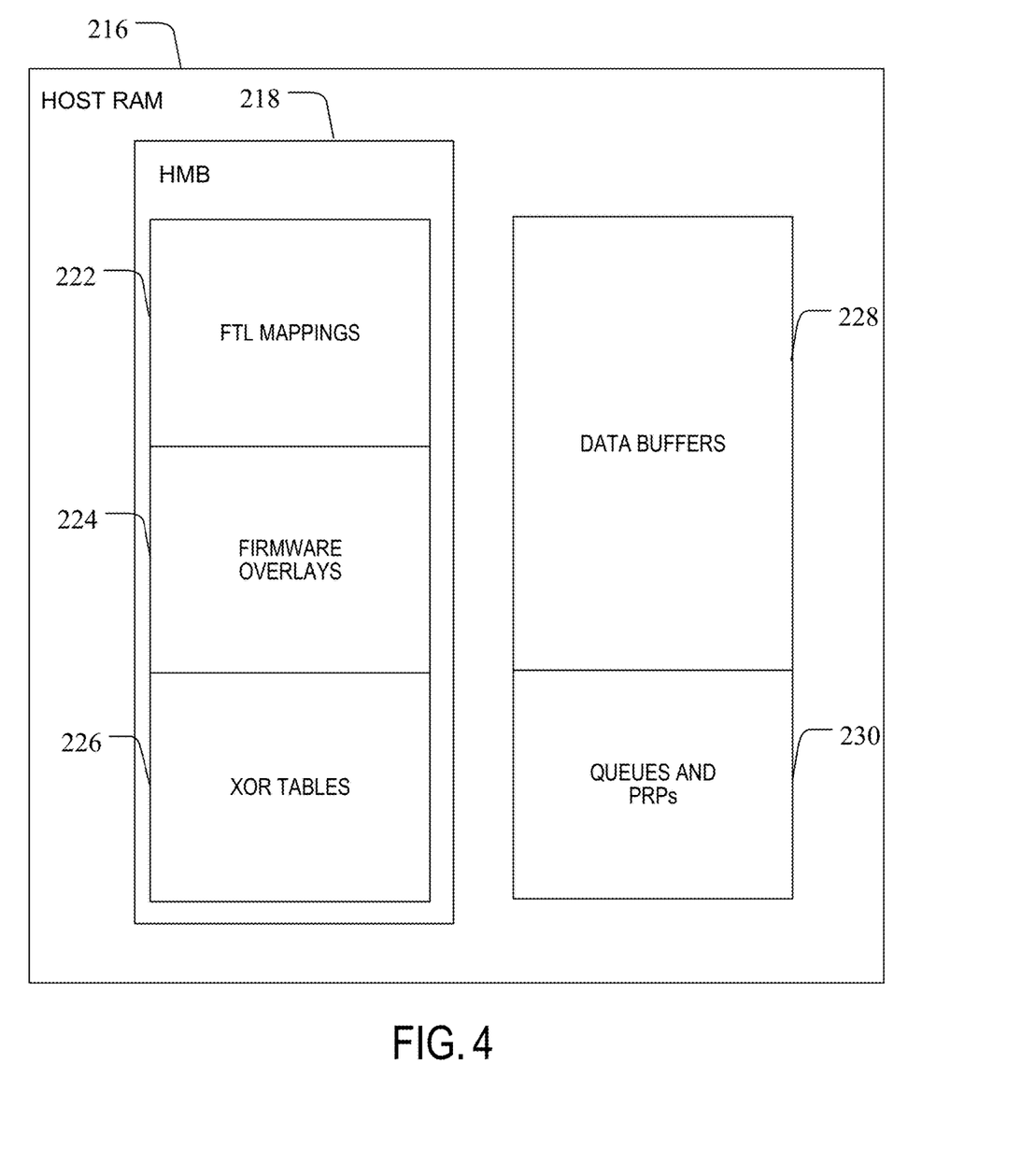
FIG. 4 is a block diagram of a more detailed view of the host memory buffer and different regions of the host RAM shown in FIG. 2A

Referring to FIG. 4, a more detailed view of an implementation of the physical memory on the host 212, such as RAM 216 on the host 212 (FIG. 2A), is shown. The portion of the RAM 216 allocated for the host memory buffer (HMB) 218 under control of the NVM system 100 may have multiple different regions each containing a different type or types of data than each other region. These regions may include a flash translation layer (FTL) mapping region 222 containing logical-to-physical mapping data for the NVM system 100, a firmware overlay region 224 containing firmware overlay data and a region for exclusive OR (XOR) tables 226 for use in error correction on the NVM system 100. Additional or other regions within the HMB 218 are contemplated. Host-controlled regions of the host RAM 216 may include any of a number of items, such as general data buffers 228 for temporary storage of host data being written to the NVM system 100 (for example data associated with a host write command) or data retrieved from storage locations on the NVM system (for example data accessed based on a host read command). The host RAM 216 may also include a separate region 230 containing one or more command queues and physical region pointers (PRPs). The PRPs may be pointers that identify wherein the data buffers 228 the data resides that is associated with the various commands in the command queues.

Utilizing the NVM system 100 and host 212 arrangement described above, a method for adaptively adjusting overall system quality of service may be implemented. As a first step, the HMB access modification module 112 may build a model of how many and/or how long accesses to different regions of the HMB 218 take for certain transactions, where a transaction may be defined as a set of commands. For example, one transaction may be the set of commands needed to open an Internet browser, while another transaction may be the set of operations needed to open an email application such as Microsoft OUTLOOK.

Figure 5:
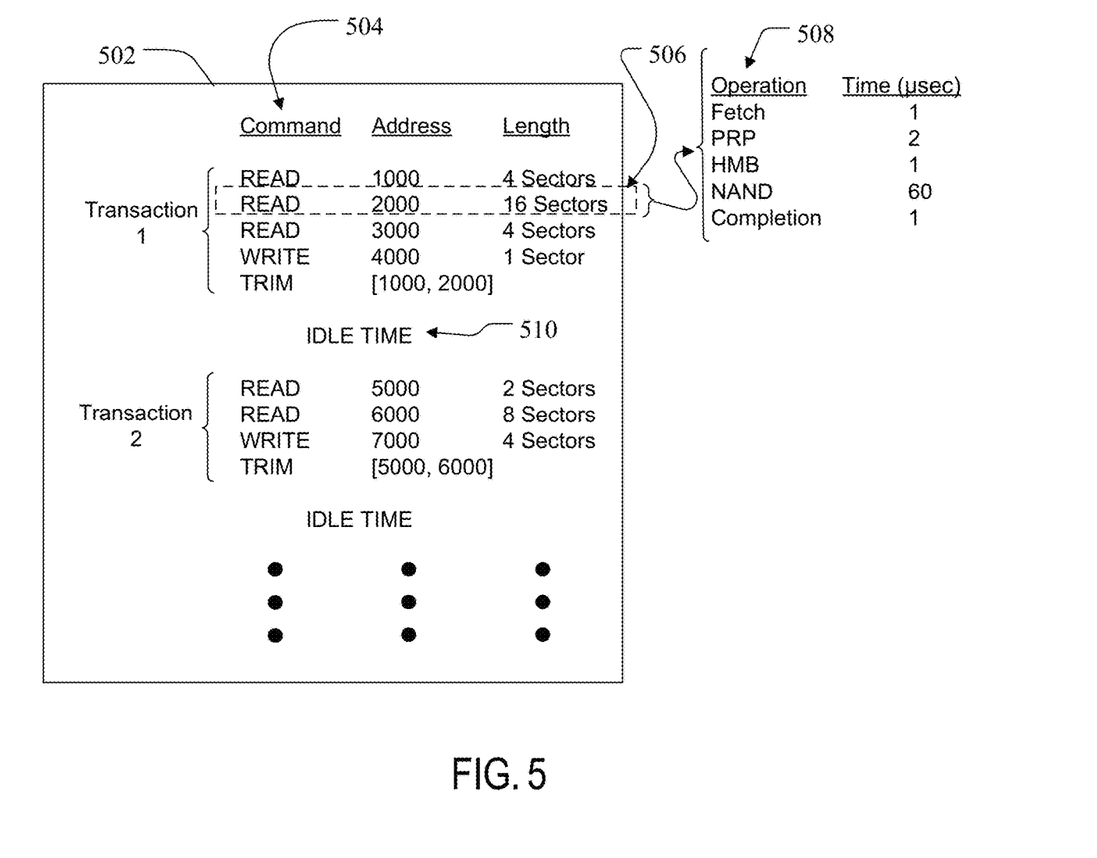
FIG. 5 illustrates examples of different workload transactions that may be executed by a storage device, and an example of operations in a command in the transaction.

Each of the hypothetical sequence of transactions 502 in FIG. 5 may include several commands 504. For example, hypothetical Transaction 1 of FIG. 5 shows a sequence of commands including three read commands, one write command and a trim command. Alongside each read or write command is listed a start address (in physical host memory) and a data length, indicating a start and stop address, that is provided with the command. From the NVM system perspective, knowledge of the particular application (browser or email, for example) that relates to the transaction is unnecessary and, instead, the HMB access modification module 112 notes the pattern of commands that make up the transaction and may assign a workload classification to the particular pattern of commands. The start of separate transactions may be identified, in one implementation, by the presence of some predetermined minimum idle time 510 between each transaction where no host operations are conducted.

Within each command 504 (e.g., read, write or trim) of each transaction, there are one or more operations executed. For example, a read command 506 of Transaction 1 shown in FIG. 1 may have multiple operations 508 that are executed in a predetermined order. The operations 508 for the read command 506 may include a fetch from a command queue, a PRP look up, a HMB access, a NAND memory access and a completion step. Each of the operations 508 have a measured response time, which may be determined by Host Interface module 120. Because the HMB 218 access times are influenced by the overall latency of the host RAM 216 (which may be dynamic RAM), the HMB access latency may be adjusted by the HMB access modification module 112 relative to the other host RAM latencies as discussed herein. The adaptive algorithm techniques described herein are configured to test different ratios of bandwidth between the different host RAM regions, and to find an improved solution for each type of workload. This analysis may be performed periodically to find a host memory access ratio.

Figure 6:
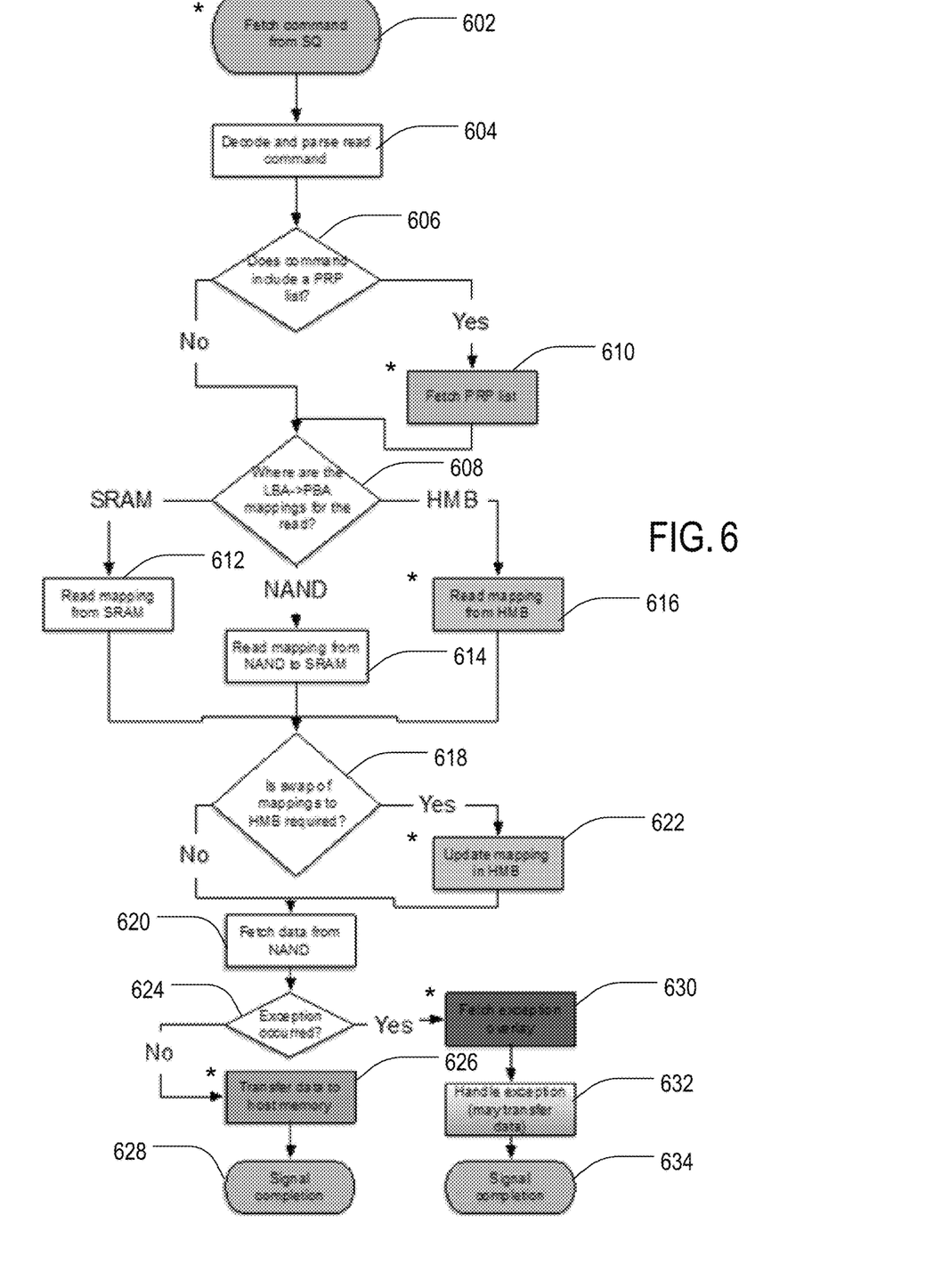
FIG. 6 is a flow diagram illustrating a more detailed version of a READ command of FIG. 5 and PCIe accesses that may be included in that workflow.

A more detailed example of the operations in the READ command 506 shown in FIG. 5, is illustrated in FIG. 6. FIG. 6 illustrates one flow of operations for the READ command and provides an example of where PCIe interface accesses (indicated in FIG. 6 by an asterisk (*) adjacent relevant steps in the flow diagram) would occur. Again, this example assumes a PCIe interface and the possible contentions and performance issues with host 212 and NVM system 100 accesses to the host RAM 216 over the PCIe interface. Other interfaces and associated access contentions are also contemplated. It should be noted that when multiple reads are submitted or arbitrated simultaneously, some accesses may be aggregated.

When the READ command is available for the NVM system 100 to execute, the controller 102 will first fetch the command from the queue/PRP region 230 in host RAM 216 (at 602). The queue may be designated the submission queue (SQ) in some implementations. The controller 102 will then decode and parse the command (at 604). If the command includes a physical region page (PRP) list, then the controller 102 will fetch the PRP list from the queue/PRP region 230 in host RAM 216 (at 606, 610). If no PRP list is included, then the controller 102 determines the location of the current logical-to-physical mapping information for logical addresses provided in the READ command (at 608). If the mapping information is already in NVM system RAM 116 it is retrieved from there (at 612), if it needs to be retrieved from non-volatile memory 104 it is retrieved from there (at 614), and if the NVM system 100 used the HMB 218 on the host 212 to store the mapping, then a PCIe access is used to retrieve the mapping information from the HMB 218 (at 616).

Depending on the amount of mapping table information maintained in the FTL mappings region 222 in the HMB 218 and the need to swap in a different portion of the mapping table information into the HMB 218, for example if the NVM system 100 uses the HMB 218 for mapping information storage and the mapping being searched for is not currently in the HMB 218, the mapping information may need to be swapped into the HMB 218 (at 618). When this swapping in of mapping information is needed, the controller 102 will need to make a PCIe access to update the mapping information (e.g. the FTL mappings region 222 of the HMB 218) (at 622). Once the mapping information for the READ command has been obtained, the controller 102 will retrieve (fetch) from the non-volatile memory 104 the data at the retrieved physical address associated with the READ command (at 620).

If an exception occurs (at 624), where something is detected indicating that there is a problem with the read from the non-volatile memory 104, then there may be the need to fetch an exception firmware overlay from the firmware overlay region 224 of the HMB 218 to handle the detected issue before completing the read operation and signaling completion (at 630, 632, 634). If there is no exception detected in the read from non-volatile memory 104 (at 624), then the data read from the non-volatile memory 104 is transferred to the appropriate data buffer in the data buffer region 228 of host RAM 216 and the controller 102 signals completion of the read to the host 212 (at 626, 628). The overlay fetch (630) and transfer of data to the host (626) both include PCIe accesses from the NVM system.

In order to manage the possible contentions in access to the host RAM 216 via the particular data bus protocol being used for devices, such as NVM system 100, accessing the host 212, a method and system for observing access to different regions of the HMB 218, and accesses to the host RAM 216 generally for different workloads, and then calibrating the timing of access rates for the different access types is performed. As indicated in the flow chart of FIG. 7, the most basic implementation is to model the HMB accesses as a function of workload class and then vary the access rate to the HMB 218 relative to the non-HMB host RAM 216 areas by the NVM system 100. A measure of effectiveness in the regression modeling may be the overall reduction in host 212 turnaround time, as determined by workloads being received by the NVM system 100. Host turnaround time is the total duration of the commands from when they are submitted to a device queue (e.g. region 230 of the host RAM 216) for the NVM system 100 until the final interrupt signaling completion. Because measurements are being made from the controller 102 of the NVM system 100, the turnaround time (latency) would be measured for each command 504 in a transaction. Referring to the example read command 506 in FIG. 5, the controller 102 would measure the time from the beginning from the first operation in element 508 to the last operation.

Figure 7:
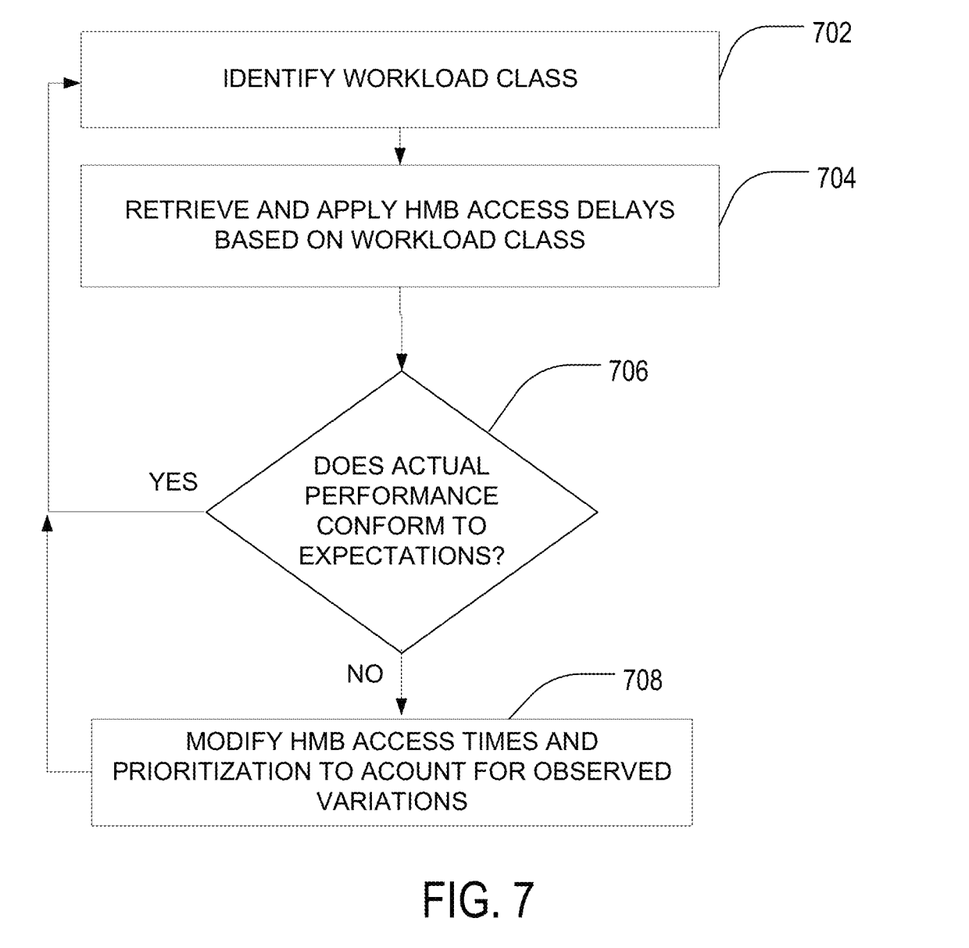
FIG. 7 is a flow diagram illustrating a method of adjusting storage device access to regions of a host memory buffer.

Referring to FIG. 7, the first step for modeling HMB accesses is for the HMB access modification module 112 to identify the class of workload, for example the collection of commands in a transaction (e.g. Transaction 1 of FIG. 5), and then retrieve a previously modeled set of HMB access delays by the controller 102 that have been determined to be optimal for preserving host responsiveness for that workload class (at 702, 704). The access times (delays) and priorities for the workload may be retrieved from RAM 116 on the NVM system 100 (or the HMB 218) and may be stored in non-volatile memory 104 as well. While the HMB access modification module 112 is determining the workload class and retrieving/applying the associated HMB access delays and priority information for use by the NVM system 100 in its accesses to the host RAM 216 during the identified class of workload, it is also periodically checking the latest performance, for example actual latency and response times for a given workload class to see if they conform to the expected HMB access time and latencies expected from the prior modeling (at 706). When the actual latencies and/or other performance criteria vary from the expected and modeled performance by a predetermined amount or percentage, then the process of modeling the particular workload class is revisited to modify the HMB 218 access delays, HMB region access priorities and other performance parameters using the latest observations for the class of workload as input for the revised modeling (at 708). In contrast, when the actual measured performance is within a predetermined range or percentage of the previously estimated performance (at 706), no recalculation need be performed and the process of recognizing the class of the next workload begins again. When needed, based on a detected variation from an expected latency, the adjustment or variation of HMB 218 access delay times may include the controller increasing or decreasing access delay times to one or more of the regions in the HMB 218 by the same or different respective amounts.

Figure 8:
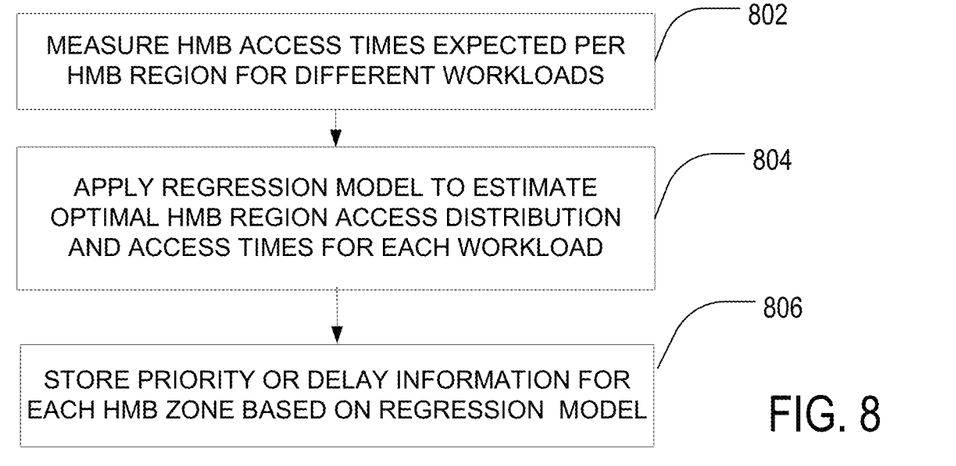
FIG. 8 is a flow diagram illustrating an offline modeling method for determining adjustment of storage device access rates to different host memory buffer regions based on workload class.
Figure 9:
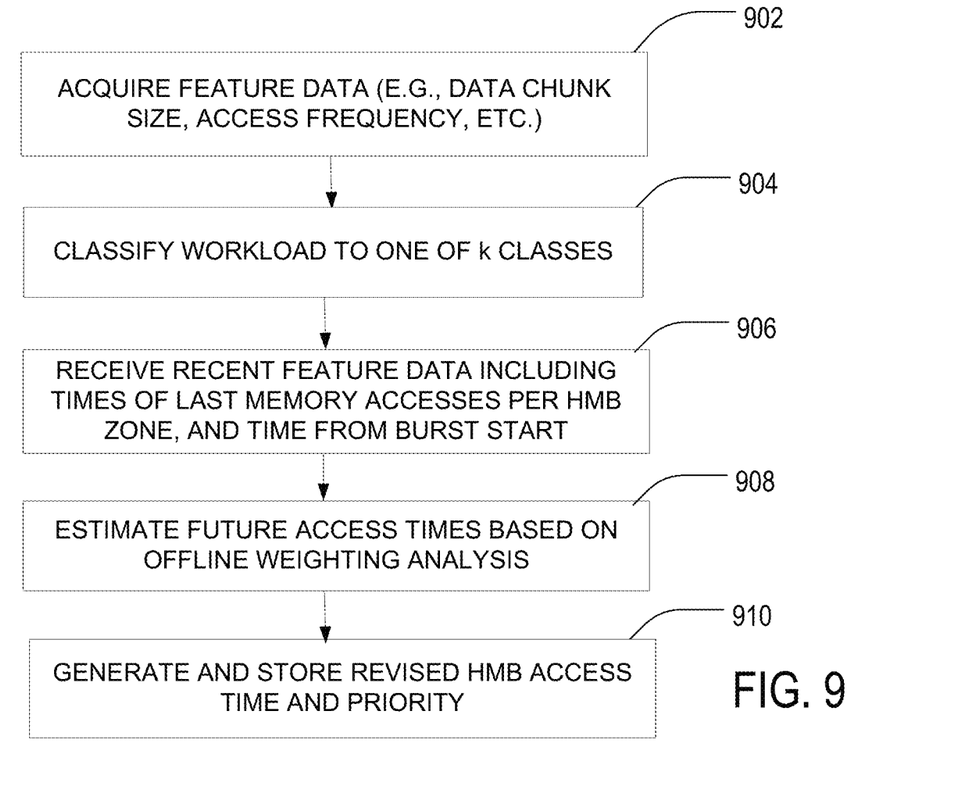
FIG. 9 is a flow diagram illustrating an online modeling method for determining adjustment of storage device access rates to different host memory buffer regions based on actual host data on latency and responsiveness

For example, as illustrated in FIGS. 8 and 9, the HMB access modification module 112 may use a part of the model building method to identify HMB access issues and periodically alter access times of the NVM system 100 to the HMB 218 to maintain desired host-NVM system performance levels. FIG. 6 illustrates an off-line analysis process that may be performed by the HMB access modification module 112, or instead may be performed at manufacture. The HMB access modification module 112 may apply sample workloads, for example several predetermined transactions for common applications such as email, web-browsing, word processing and so on, and can measure the host memory access times (at 802). The HMB access modification module 112 of the controller 102 may then apply a modeling process to the measured data to estimate, for each HMB region (for example, the FTL mappings 222, firmware overlays 224 and XOR tables 226 regions of the HMB 218 in the embodiment of FIG. 4), to determine optimal HMD 218 access distribution and access times for the different sample workloads (at 804).

The modeling process may involve predetermining different workload classes and the model may be any of a number of known regression models. The workload classes, such as the two example workload classes of Transaction 1 and Transaction 2 of FIG. 5 may be predefined by the controller designer or by the host 212 and calculated in an off-line mode without live data. These workload classes may later be adjusted by the HMB access modification module 112 during NVM system 100 use using a burst detection mechanism. Any of a number of burst detection mechanisms may be utilized and may include the controller 102 measuring parameters such as host write activity in the form of the amount of data received, or the number of different write commands received, within a predetermined time period. Examples of some suitable burst detection mechanisms may be found in U.S. Pat. No. 9,569,352, the entirety of which is hereby incorporated herein by reference.

The modeling process may include use of a machine learning classification algorithm, such as support vector machine (SVM), Mixture-Of-Gaussians, K-Nearest-Neighbors, K-means clustering and other known modeling algorithms. The selected modeling algorithm may be applied to particular workload class and could be attributed to one of those classes. Each class is related to a certain set/series of access times. The relevant features provided to the modeling algorithm may include the read chunk size, access frequency, access type (random/sequential) etc. Given a classification to one of the workload types, the controller 102 may take different strategies to prioritize different HMB region access, and the expected access time to each of the regions.

An example of a K-means algorithm may be found below: Given a set of observations $(x_1, x_2, \ldots x_n)$, where each observation is a d-dimensional real vector (here, d is the number of relevant features that we intend to keep, and n is the number of accesses that we intend to classify), k-means clustering aims to partition the n observations into k ($\leq$n) sets $S=\{S_1, S_2, \ldots, S_k\}$ (k here would be the number of different workloads that we can identify) so as to minimize the within-cluster sum of squares (WCSS) (sum of distance functions of each point in the duster to the K center). In other words, its objective is to find:

$$\arg\min_{S} \sum_{i=1}^{k} \sum_{x \in S_i} \|x - \mu_i\|^2$$

where $\mu_i$ is the mean of points in $S_i$.

Alternative machine learning algorithms that can be used by the controller 102 to model the access distribution and times may include regression-type machine learning algorithm such as General-Linear-Model (GLM), or Logistic-Regression in order to predict the Latency/Throughput/Power which is related to current access scenario. The decisions taken accordingly could be based on given thresholds or comparisons (e.g. when a current HMB access scenario deviates from a given latency—a swap action of physical locations at the HMB is initiated).

Using the feedback from different access regions, and given the classification of workload type (as shown in previous embodiment) the HMB access modification module can predict the behavior of each HMB region 222, 224, 226 or all Host RAM 216 regions by following a regression-type machine learning algorithm. Any of a number of regression-type algorithms may be executed via the HMB access modification module 112. Suitable machine learning regression-type algorithms may include the General Linear Model (GLM) or Logistics-Regression in order to predict latency/throughput/power which is related to the current HMB 218 access scenario.

The GLM model may be trained so it fits the optimal access time over all access regions per each workload scenario, for a series of access times and features such as time from burst start, time from previous command, etc. The training may be done offline, for example in a manufacturing or device initiation setting when no host commands are pending. The model-generated weights, access region priorities or HMB access delay information that are associated with every access region (according to their maximal number) may be stored in the controller 102, so that no latency impact occurs because of this calculation (at 806).

As noted above with respect to FIG. 7, the predetermined modeling of access priorities and HMB region access delays for different predetermined classes of workloads is helpful to start off storage device management of HMB access, but periodic adjustment of the access delay and priority values for each HMB region may be needed. As shown in FIG. 9, the online process of estimating future access times needed for each HMB region based on actual measurements, as compared to the offline modeling of FIG. 8, allows for the HMB access modification module 112 to provide a dynamic adjustments to the access delay values. In tandem with the actual processing of the various commands and operations in host workloads, the HMB access modification module 112 is observing feature data, such as the data chunk size in an operation, the access frequency of the HMB 218 and other parameters, and classifying the workload to one of the "k" predetermined workload classes (at 902, 904), where k refers to the integer number of workload classes that have been defined for the NVM system 100.

The HMB access modification module 112 of the controller 102 receives the most recent feature data relating to measurements of latency, including last HMB region access times, time for response from a burst start and estimated future access times/delays needed to achieve the desired performance. At a high level, this desired performance may be defined as the minimum turnaround time for a set command sequence which is mostly synchronous (i.e., for a low command queue depth), or the highest throughput for a command sequence which is mostly asynchronous (i.e. for a high aggregate queue depth)(at 906). Thus, the HMB access time for a given HMB region for a particular workload are those HMB access times that achieve or come closest to achieving the desired performance as defined above. Using the same modeling technique of the offline analysis of FIG.

8 and this latest received input, the HMB access modification module 112 estimates future access/delay times (at 908). If there are differences, or in some implementations differences above a predetermined threshold, between the last determined access/delay time and the newly estimated numbers, then a revised set of HMB access time and priority data is stored in the NVM system 100 for use in the next set of operations in the associated workload class (at 910).

The HMB access modification module 112 may then use the revised set of HMB access and priority data to apply different access delays to different regions of the HMB 218 therefore reducing contention issues to reduce turnaround time and increase command throughput of host commands. For example, the HMB access modification module 112 may add a first delay period in all accesses made by the controller 102 to a first memory region of the HMB 218 and add a second, different, delay period in all accesses made by the controller 102 to a second memory region of the HMB 218.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two-dimensional memory structure or a three-dimensional memory structure.

In a two dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

Methods and systems have been disclosed for NVM systems that utilize HMB memory on a host to adjust the access timing by the NVM system to the HMB to avoid overly impacting responsiveness of the host due to contentions with access to the host RAM by the host and the NVM system. A system and method for reducing performance penalties of a host that is supplying a host memory buffer (HMB) for use by an NVM system is described. The system and method may use adaptive algorithms to selectively limit the rate specific PCIe accesses by the NVM system based on implicit or explicit feedback from the host. The method may include modeling desired HMB access timing by the NVM system in an initial offline analysis for multiple classes of workloads, periodically updating the access timing data stored in the storage device based on actual use and using the current HMB access timing information to modify storage device controller access to the HMB on the host. Contentions on a host data bus, such as the PCIe data bus example provided above, may reduce system performance such that limiting throughput in certain steps of a transaction to reduce such contentions may improve performance.

The initial offline analysis and the periodic updates may be achieved by using simulated (e.g., simulated HMB access times for different HMB regions) and actual host latency data (e.g., measured HMB access times seen for that host for different HMB regions), respectively, in a regression algorithm, and then storing the access timing information determined in the analysis for use on different workloads. The system may include a non-volatile memory controller that quantifies different HMB access timing for different host workloads based on individual HMB regions.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A non-volatile memory system comprising:
    an interface configured to place the non-volatile memory system in communication with a host comprising a host memory buffer and a command queue;
    a non-volatile memory; and
    a controller in communication with the non-volatile memory and the interface, wherein the controller is configured to:
        determine a first delay period and a second delay period associated with a workload class of a set of commands in the command queue on the host;
        add the first delay period to all accesses made by the controller to a first memory region of the host memory buffer to execute the set of commands;
        add the second delay period to all accesses made by the controller to a second memory region of the host memory buffer to execute the set of commands; and
        subsequent to executing the set of commands, dynamically modify one or both of the first delay period and second delay period to account for a variation between a time spent executing the set of commands and an expected time to execute the set of commands;
    wherein:
        the first delay period differs from the second delay period; and
        the first memory region differs from the second memory region.

2. The non-volatile memory system of claim 1, wherein:
the host memory buffer comprises a volatile memory; and
the first memory region contains a first type of data.

3. The non-volatile memory system of claim 2, wherein:
the first type of data comprises logical-to-physical mapping table data; and
the second memory region comprises firmware overlay data for the non-volatile memory system.

4. The non-volatile memory system of claim 1, wherein the controller is further configured to dynamically change the first delay period in response to receipt, from the host, of latency measurements for commands sent to the host memory buffer from the controller.

5. The non-volatile memory system of claim 1, wherein the controller is further configured to periodically adjust delay periods for controller access to each of a plurality of memory regions of the host memory buffer in response to latency measurements received from the host.

6. The non-volatile memory system of claim 1, wherein the set of commands comprises commands to read, write, or trim data in the non-volatile memory.

7. The non-volatile memory system of claim 6, wherein a command in the set of commands comprises at least one operation including an access to the first or the second memory region of the host memory buffer by the controller.

8. The non-volatile memory system of claim 1, wherein the controller is further configured to, subsequent to executing the set of commands:
    compare the time spent executing the set of commands with the expected time to execute the set of commands.

9. The non-volatile memory system of claim 1, wherein the non-volatile memory comprises a substrate formed with a three-dimensional memory structure.

10. A method of processing memory accesses, the method comprising:
    performing the following in a non-volatile memory system comprising an interface configured to place the non-volatile memory system in communication with a host comprising a host memory buffer and a command queue:
        determining, in an offline modeling process, a first delay period and a second delay period;

identifying a workload class fora set of commands in the command queue on the host to be executed by a controller of the non-volatile memory system, wherein the workload class is associated with the first delay period and the second delay period;

adding the first delay period to accesses made by the controller to a first memory region of the host memory buffer to execute the set of commands;

adding the second delay period to accesses made by the controller to a second memory region of the host memory buffer to execute the set of commands;

receiving host response latency data from the host in response to a variation between a time spent executing the set of commands and an expected time to execute the set of commands; and in response to receiving the host response latency data, modifying one or both of the first delay period and second delay period to account for the variation.

11. The method of claim 10, wherein the offline modeling process comprises the controller applying a regression algorithm to simulated host memory buffer access times for different workload classes to estimate a desired host memory buffer access timing.

12. The method of claim 11, further comprising applying the regression algorithm to received host response latency data.

13. The method of claim 10, wherein the non-volatile memory system comprises a three-dimensional memory array.

14. A non-volatile memory system comprising:
an interface configured to place the non-volatile memory system in communication with a host comprising a host memory buffer and a command queue:
a non-volatile memory; and means, in communication with the non-volatile memory and the interface, for:

determining, in an offline modeling process, a first delay period and a second delay period identifying a workload class for a set of commands in the command queue on the host to be executed by a controller of the non-volatile memory system, second delay period;

adding the first delay period to accesses made by the controller to a first memory region of the host memory buffer to execute the set of commands;

adding the second delay period to accesses made by the controller to a second memory region of the host memory buffer to execute the set of commands;

receiving host response latency data from the host in response to a variation between a time spent executing the set of commands and an expected time to execute the set of commands; and in response to receiving the host response latency data, modifying one or both of the first delay period and second delay period to account for the variation.

15. The non-volatile memory system of claim 14, wherein the means for determining comprises a controller configured to apply a regression algorithm to simulated host memory buffer access times for different workload classes.

16. The non-volatile memory system of claim 14, wherein the means for modifying comprises a controller configured to apply a regression algorithm to received host response latency data.

17. The non-volatile memory system of claim 16, wherein the host memory buffer comprises a portion of a volatile memory on the host under control of the controller of the non -volatile memory system.

18. The non-volatile memory system of claim 14, wherein the non-volatile memory comprises a three-dimensional memory array.

* * * * *